(12) United States Patent
Matthews et al.

(10) Patent No.: US 8,949,027 B2
(45) Date of Patent: Feb. 3, 2015

(54) MULTIPLE TRUTH REFERENCE SYSTEM AND METHOD

(75) Inventors: Christopher Jay Matthews, Morristown, NJ (US); Richard S. Russell, Morristown, NJ (US); Tom Jakel, Morristown, NJ (US); Michael Ray Elgersma, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 289 days.

(21) Appl. No.: 13/545,220

(22) Filed: Jul. 10, 2012

(65) Prior Publication Data

US 2014/0019046 A1    Jan. 16, 2014

(51) Int. Cl.
| | | |
|---|---|---|
| G01C 21/34 | (2006.01) | |
| G01C 17/38 | (2006.01) | |
| G01C 21/28 | (2006.01) | |

(52) U.S. Cl.
CPC ............... *G01C 17/38* (2013.01); *G01C 21/28* (2013.01)
USPC ............................. 701/534; 701/528; 701/535

(58) Field of Classification Search
CPC ................................ G01C 17/38; G01C 21/28
USPC .................................................. 701/534, 535
See application file for complete search history.

(56) References Cited

U.S. PATENT DOCUMENTS

| | | | |
|---|---|---|---|
| 5,922,041 A * | 7/1999 | Anderson ..................... 701/468 |
| 6,157,894 A | 12/2000 | Hess et al. | |
| 6,516,021 B1 | 2/2003 | Abbott | |
| 6,714,866 B2 | 3/2004 | Jones et al. | |
| 6,721,770 B1 | 4/2004 | Morton et al. | |
| 6,860,023 B2 | 3/2005 | Manfred et al. | |
| 7,146,740 B2 | 12/2006 | Manfred | |
| 7,797,132 B1 * | 9/2010 | Lele et al. ..................... 702/182 |
| 7,844,397 B2 | 11/2010 | Lund et al. | |
| 8,301,374 B2 * | 10/2012 | Surampudi et al. ........... 701/438 |
| 2004/0204846 A1 * | 10/2004 | Yano et al. ..................... 701/210 |
| 2004/0220733 A1 * | 11/2004 | Pasturel et al. ............... 701/214 |
| 2005/0125141 A1 * | 6/2005 | Bye .............................. 701/200 |
| 2010/0052949 A1 * | 3/2010 | Suddreth et al. ......... 340/995.19 |
| 2010/0088064 A1 | 4/2010 | Lund et al. | |

(Continued)

OTHER PUBLICATIONS

Bohenek et al., "High Rate Time-Space-Position-Information for High Dynamic GPS Integrated Navigation Systems", Apr. 1996, pp. 56-62, Publisher: IEEE.

(Continued)

*Primary Examiner* — Calvin Cheung
(74) *Attorney, Agent, or Firm* — Fogg & Powers LLC (57) ABSTRACT

A system comprises a plurality of reference navigation systems, each reference navigation system configured to generate a respective reference navigation solution. The system also comprises a test navigation system, the test navigation system configured to generate a test navigation solution; and a processing unit configured to compare the test navigation solution to each of the respective reference navigation solutions to estimate one or more errors in the differences between the test navigation solution and the respective reference navigation solutions. The processing unit is further configured to update the respective reference navigation solutions to account for the corresponding one or more estimated errors. The processing unit is also configured to compare the test navigation solution to the updated reference navigation solutions to generate a performance score representative of the performance of the test navigation system.

20 Claims, 4 Drawing Sheets

(56) References Cited

U.S. PATENT DOCUMENTS

| | | | |
|---|---|---|---|
| 2010/0286852 A1* | 11/2010 | Bouquet | 701/17 |
| 2011/0098915 A1* | 4/2011 | Disatnik et al. | 701/201 |
| 2011/0098922 A1* | 4/2011 | Ibrahim | 701/208 |
| 2012/0296496 A1* | 11/2012 | Hedrick et al. | 701/3 |
| 2013/0261954 A1* | 10/2013 | Boschker et al. | 701/410 |
| 2014/0100780 A1* | 4/2014 | Caine et al. | 701/533 |

OTHER PUBLICATIONS

Brown et al., "Performance Test Results of an Integrated GPS/MEMS Inertial Navigation Package", Sep. 2004, pp. 1-8, Publisher: NAVSYS Corporation.

Changyue et al., "Transfer alignment of shipborne intertial-guided weapon systems", "Journal of Systems Engineering and Electronics", Oct. 10, 2007, pp. 348-353, vol. 20, No. 2.

Nadeau, "The CIFTG Connection: A Story of Precision Testing at the Central Inertial Guidance Test Facility", Dec. 22, 2011, pp. 283-292.

Lawrence et al., "CIGTF Enhanced Precision Reference Systems", Dec. 21, 2011, pp. 935-939.

Massing, "Common Range Integrated Instrumentation System", Oct. 2010, pp. 114, Publisher: National Defense Industrial Association.

"Data Fusion ", "http://en.wikipedia.org/wiki/Data_fusion accessed Mar. 15, 2012", pp. 1-7, Publisher: Wikipedia.

Chu et al., "GNSS Receiver Evaluation", "http://www.gpsworld.com/transportation/gnss-receiver-evaluation", Dec. 17, 2009, pp. 1-10.

"Help from Above, Inside GNSS", "http://www.insidegnss.com/node/2200 accessed Feb. 22, 2012", pp. 1-6.

Julier et al., "A Non-divergent Estimation Algorithm in the Presence of Unknown Correlations", Jun. 1997, pp. 1-5.

Kerr, "Extending Decentralized Kalman Filtering Results for Novel Real-Time Multisensor Image Fusion and/or Restoration", "SPIE vol. 2755", May 19, 2011, pp. 548-564.

Longstaff et al., "Commercial Aviation Navigation Systems Analysis Toolset", Sep. 1997, pp. 1-6, Publisher: NAVSYS Corporation.

Mostafa et al., "GPS/IMU products—the Applanix approach", "Photogrammetric Week 01", 2001, pp. 63-83.

Page et al., "Central inertial Guidance Test Facility (CIGTF) Testing of a Depolarized Fiber Optic Gyro Intertial Sensor Assembly", Jan. 1995, pp. 651-656, Publisher: The Institute of Navigation.

"Sensor Fusion", "http://en.wikipedia.org/wiki/Sensor_fusion accessed Mar. 15, 2012", pp. 1-4, Publisher: Wikipedia.

Weed et al., "GPS Align in Motion of Civilian Strapdown INS", Apr. 2004, pp. 1-9, Publisher: Honeywell Commercial Aviation Products.

"United States Air Force at White Sands Missile Range", "http://www.wsmr.army.mil/testcenter/TWSO/Pages/UnitedStates accessed Feb. 22, 2012", Apr. 13, 2010, pp. 1-2.

Brown et al., "Testing of Ultra-Tightly-Coupled GPS Operation Using a Precision GPS/Inertial Simulator", "Proceedings of ION GNSS 2005", Sep. 2005, pp. 1-9.

Mahmood et al., "CRIIS High Accuracy TSPI Architecture and Technical maturity Demonstration Test Results", Jan. 27, 2011, pp. 1-40.

Kerr III, "Apparent Drawbacks that Exist in the Underlying Structure of Covariance Intersection", "available at http://www.tekassociates.biz/myciview.pdf date accessed Apr. 20, 2012", pp. 1-8.

Neu, "A Tightly-Coupled INS/GPS Integration Using a MEMS IMU", Sep. 2004, pp. 1-112, Publisher: Department of the Air Force Air University.

Strus et al., "GPS/IMU Development of a High Accuracy Pointing System for Maneuvering Platforms", Mar. 4, 2008, pp. 30-37, Publisher: www.insidegnss.com.

Walter et al., "Flight Inspection of GNSS SBAS Procedures", Jun. 2006, pp. 112.

\* cited by examiner

MULTIPLE TRUTH REFERENCE SYSTEM AND METHOD

GOVERNMENT LICENSE RIGHTS

This invention was made with government support under Government Contract No. FA8678-10-C-0058 awarded by the United States Air Force. The U.S. Government may have certain rights in the invention.

BACKGROUND

A truth reference system includes a truth source that is an independent sensor, measuring device or other source of spatial information with an accuracy known to be within desired parameters or bounds. The truth source can be used to assess the performance of a navigation system, to calibrate it, to correct its performance, and so on. For example, in order to qualify a new navigation system such as for an aircraft, both the truth source and the new navigation system record navigation information while the aircraft is in operation. After the flight (post-mission) or even during flight, the data from the new navigation system is analyzed and compared against the data from truth source in order to verify whether the new navigation system performed properly and up to desired performance specifications Likewise, the performance of satellites, naval navigation systems, tanks, trains, automobile, map-creation systems, etc., may be evaluated in a similar manner.

SUMMARY

In one embodiment, a system is provided. The system comprises a plurality of reference navigation systems, each reference navigation system configured to generate a respective reference navigation solution. The system also comprises a test navigation system, the test navigation system configured to generate a test navigation solution; and a processing unit configured to compare the test navigation solution to each of the respective reference navigation solutions to estimate one or more errors in the differences between the test navigation solution and the respective reference navigation solutions. The processing unit is further configured to update the respective reference navigation solutions to account for the corresponding one or more estimated errors. The processing unit is also configured to compare the test navigation solution to the updated reference navigation solutions to generate a performance score representative of the performance of the test navigation system.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
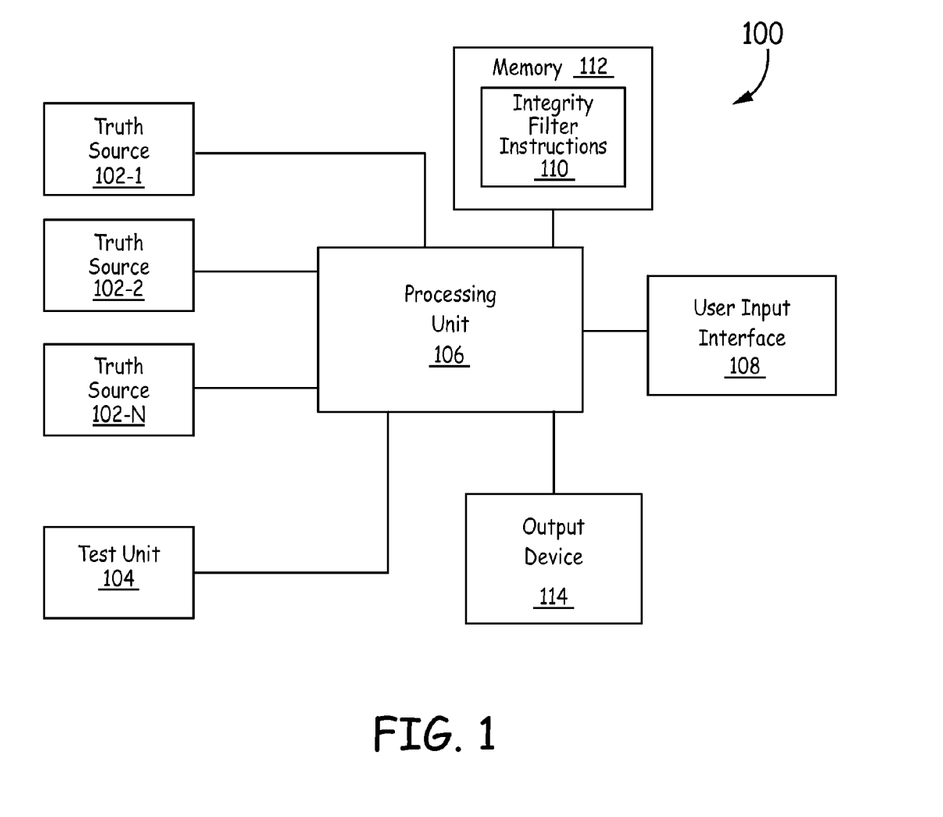
FIG. 1 is a high level block diagram of one embodiment of a truth reference system.

FIG. 1 is a high level block diagram of one embodiment of an exemplary truth reference system 100. Truth reference system 100 can be included on vehicles such as, but not limited to, satellites, missiles, ground vehicles, or air vehicles. In addition, the truth reference system can be included in a navigation device that can be worn by an individual to measure movement of the individual. Truth reference system 100 is configured to analyze the performance of a test unit 104 which is also referred to as a unit under test (UUT) or test navigation system. A processing unit 106 in the truth reference system 100 analyzes the performance of the test unit 104 based on navigation data received from a plurality of truth sources 102-1 . . . 102-N. In this example, there are 3 truth sources 102. However, it is to be understood that 2 or more than 3 truth sources 102 can be used in other embodiments.

Each truth source 102 and the test unit 104 is a navigation system configured to provide a navigation solution to the processing unit 106. For example, the components of the navigation solution can include, but are not limited to, linear position, linear velocity, linear acceleration, angular position, and angular velocity. Other components can also be included depending on the navigation system. For example, a Global Positioning System (GPS) receiver can provide GPS time of validity which includes the validity of the GPS week and GPS time of week measurements. The linear position includes the coordinates of the body frame (e.g. the vehicle frame or user frame to which the system 100 is attached) with respect to the Earth frame. Similarly, the linear velocity measures the rate of change of linear position with respect to the Earth frame and the linear acceleration measures the rate of change of linear velocity with respect to the Earth frame. The angular position represents the angular position of the body frame as a transformation matrix from the body frame to the Earth frame. The angular velocity measures the angular velocity of the body frame with respect to the Earth frame. Thus, the navigation solution represents the actual movement of the vehicle or person to which the truth reference system is attached.

In this embodiment, the truth sources 102 are not implemented using identical navigation systems. For example, truth source 102-1 is implemented in this example using the NovAtel™ SPAN™ navigation system. Truth source 102-2 is implemented, in this example, with a Honeywell™ Embedded GPS/IMU (EGI) navigation system which tightly couples the GPS and IMU. Tightly coupled refers to the level of integration between the IMU and the GPS measurement and feedback controls, as known to one of skill in the art. For example, a tightly coupled system is one in which the raw data from the IMU and the raw data from the GPS are combined, such as through an integrated Kalman filter, to produce a single navigation solution, rather than a separate GPS solution and a separate IMU solution. An ultra-tightly coupled system is similar to a tightly coupled system, but also includes GPS signal tracking and integration into the Kalman filter.

In this example, the truth source 102-N is implemented with a Common Range Integrated Instrumentation System (CRIIS) Time, Space, and Position Information (TSPI) navigation system. One embodiment of a CRIIS TSPI is described in more detail with respect to FIG. 2 below. It is to be noted that the navigation systems discussed above are provided by way of example only and that other navigation systems can be used in other embodiments for the truth sources 102.

The specific components of the navigation solution provided by each of the truth sources 102 overlap the components of the navigation solution provided by the other truth sources 102. However, each truth source 102 does not provide the same navigation solution in each embodiment. For example, in some embodiments, one of the truth sources 102, such as the NovAtel™ SPAN™ navigation system, does not provide angular velocity information whereas one or more of the other truth sources 102 does provide angular velocity information.

Additionally, in the example of FIG. 1, the test unit 104 is also implemented using a CRIIS TSPI. Thus, both the test unit 104 and one of the truth sources 102-N are both implemented with the same type of device. In such embodiments, the test unit 104 and the truth source 102-N can be configured to swap roles. That is, the processing unit 106 is configured to use the navigation solution from the test unit 104 as a truth source and to analyze the navigation solution from the truth source 102-N as data from a test unit when the roles are swapped. Indeed, in some embodiments, the processing unit 106 can be configured to select the navigation solution from any one of the truth sources 102 or the test unit 104 as the test data and to use the navigation solution from the other navigation systems as the truth source navigation solution. For example, the user input interface 108 is optionally included in some embodiments to enable configuration of the truth reference system 100. In other embodiments, the processing unit 106 is configured to automatically select which navigation system will be viewed as a test unit.

The processing unit 106 includes or functions with software programs, firmware or other computer readable instructions for carrying out various methods, process tasks, calculations, and control functions, used in the analysis and filtering of navigation solution received from the truth sources 102 and the test unit 104, as described in more detail below.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In this example, integrity filter instructions 110 are stored on memory 112. The integrity filter instructions 110 are accessed and executed by the processing unit 106. The integrity filter instructions 110 cause or configure the processing unit 106 to identify and remove one or more errors causing differences between the navigation solution from the test unit 104 and respective navigation solution from truth sources 102. In particular, based on an analysis of the navigation solution from each of the truth sources 102, the processing unit 102 is able to identify one or more sources of error in calculating differences between the truth sources 102 and the test unit 104. For example, the processing unit 102 is configured to identify one or more of lever-arm, orientation (misalignment), and time skew anomaly errors.

The above errors can be caused by the arrangement of the truth sources 102 and the test unit 104 in the system 100. For example, the orientation or alignment of a given truth source 102 with respect to the test unit 104 may introduce an error. Similarly, a difference in the perpendicular distance between an axis of rotation and the test unit 104 and the perpendicular distance between a given truth source 102 and the axis of rotation can introduce a lever arm error. Similarly, the timing of a given truth source 102 may not be properly synchronized with the test unit 104 causing time skew errors. For example, each navigation state (e.g. velocity, position, etc.) in each truth source 102 and in the test unit 104 has its own time of validity. Thus, the position time of validity of one of the truth sources 102 might not be synchronized with the position time of validity in the test unit 104, but the respective velocity time of validity in the same truth source 102 may be synchronized with the test unit 104. Hence, in some embodiments, a separate time skew error is calculated for at least the position, velocity, and attitude navigation states.

Therefore, each of the truth sources 102 can be functioning properly, but an error may still be introduced by one of the above error sources into a comparison of the navigation solution of the test unit 104 to the navigation solution of the truth sources 102. Hence, a properly functioning test unit can be erroneously identified as faulty due to differences introduced by the errors. Alternatively, a faulty test unit can be erroneously identified as functioning properly if the errors cover or mask faults in the measurements from the test unit 104.

In addition, a failure may occur with the navigation performance of one of the truth sources 102. The test unit 104 or other truth sources 102 may not be able to identify that failure has occurred. Hence, the processing unit 106 is configured to analyze and compare the navigation solution from each of the truth sources 102 and the test unit 104 to identify errors or failures. When the processing unit 106 identifies an error, the processing unit 106 updates the navigation solution of the corresponding truth source 102. After updating the navigation solution of the corresponding truth source 102, the processing unit 106 compares the navigation solution from the test unit 104 to the updated navigation solution to analyze the performance of the test unit 104. The analyzed performance of the test unit 104 is output to the output device 114. The output device 114 can be implemented as a display unit, a printer, a memory device, etc. which can be used to store and/or provide the performance information to a user. For example, the performance information can be displayed a series of graphs or figures on a display unit, the graphs and figures representing one or more elements of the performance analysis of the test unit 104.

Furthermore, in some embodiments, the integrity filter instructions 110 cause the processing unit 106 to produce a composite truth source from the updated navigation solution and to evaluate the performance of the test unit 104 based on a comparison to the composite truth source. The performance results of this comparison can also be output to the output device 114.

In executing the integrity filter instructions 110 to estimate errors, such as lever arm or orientation errors, the processing unit 106 executes, in this example, a recursive least squares estimator with process noise. The recursive least squares estimator operates under the assumption that the states it estimates are constant. This assumption is valid given that in the body frame of reference, the lever arms, or linear distances between the origins of the respective frame of the different devices, should be constant. Additionally, the misalignment error states can be considered a combination of constant non-orthogonality and mount-to-mount misalignment errors. The time skews are treated as time alignment constant biases that are independent between navigation states.

In operation, each of the truth sources 102 and the test unit 104 provide navigation data to the processing unit 106 regarding one or more states (e.g. linear position, velocity, etc.) of the vehicle to which it is attached. In some embodiments, the navigation data is provided in real time to the processing unit 106 as it is measured. In other embodiments, the truth sources 102 and test unit 104 record and store the measurements until the end of a predetermined period of time or until after the occurrence of a specified event. For example, the specified event can be arrival at a predetermined geographic location. Alternatively, the specified event can be a command from the processing unit 106 instructing the truth sources 102 and the test unit 104 to provide the navigation data. At the end of the predetermined period of time or after the occurrence of the specified event, the test unit 104 and the truth sources 102 provide the navigation data to the processing unit 106.

The processing unit 106 estimates errors in the differences between states measured by the truth sources 102 and states measured by the test unit 104. These errors can be due to lever arm, misalignment, or time skew, as discussed above, or to fault in one of the truth sources 102. The processing unit 106 estimates the errors based on comparisons between the respective navigation solution of the plurality of truth sources 102 and the navigation solution of the test unit 104.

After estimating the errors in the differences, the processing unit 106 updates the respective navigation solution provided by each of the truth sources 102 to account for the errors. The processing unit 106 then compares the navigation solution from the test unit 104 to each of the respective updated navigation solutions from the truth sources 102. Based on the comparison to the updated navigation solutions, the processing unit 106 assesses the performance of the test unit 104. For example, the processing unit 106 can generate a performance score which is indicative of the performance of the test unit 104.

In addition, in some embodiments, the processing unit 106 generates a composite truth source navigation solution based on the navigation solution from each of the truth sources 102. In such embodiments, the processing unit 106 compares the navigation solution from the test unit to the composite truth source navigation solution to provide a further assessment of the test unit 104 performance. In addition, in some embodiment, the processing unit 106 compares the navigation solution from each of the truth sources 102 to one another. By doing so, the processing unit 106 measures the integrity of the truth sources 102 and can identify errors or faults in one of the truth sources 102.

Figure 4:
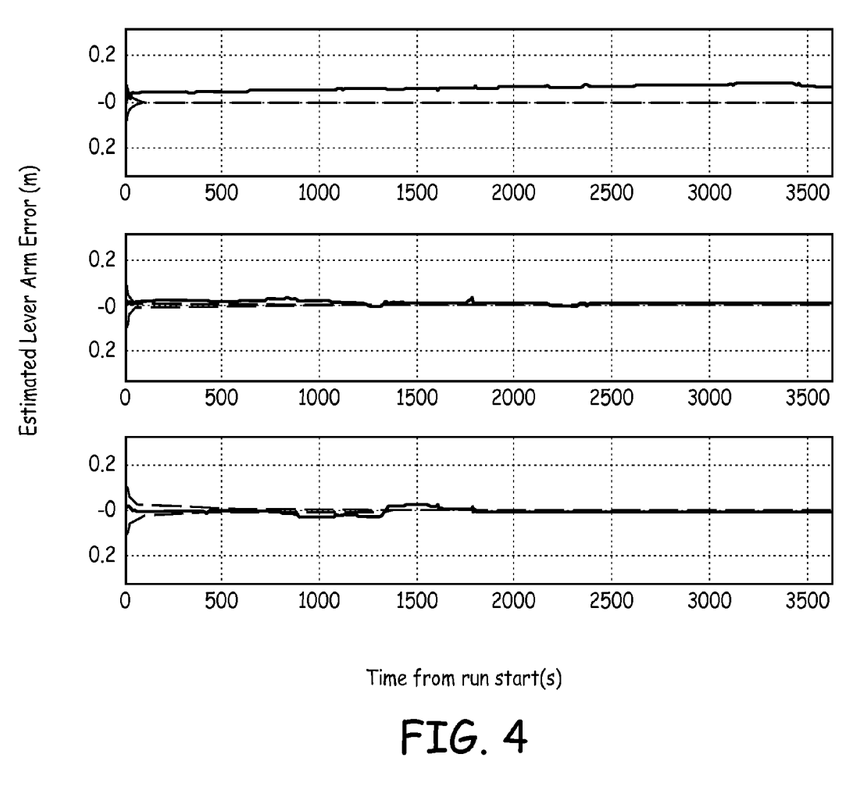
FIG. 4 depicts exemplary graphs showing lever arm error estimates between an exemplary truth source and an exemplary test unit.

The processing unit 106 then outputs the performance assessment of the test unit 104, the error estimates, and/or the measured integrity of the truth sources 102, if applicable, to the output device to communicate the data to a user. For example, the processing unit 106 can generate graphs or figures to present the data to the user. Exemplary graphs depicting lever arm error estimates for each Cartesian coordinate axis between one truth source and the test unit are shown in FIG. 4. It is to be understood that the graphs depicted in FIG. 4 are presented by way of example only and that the graphs are dependent on the specific data obtained in each respective embodiment.

In addition, as stated above, the processing unit 106 executes a recursive least squares estimator with process noise to estimate and remove error. For example, a Kalman filter, or Linear Quadratic Estimation (LQE), can be executed by the processing unit 106. For a truth reference system having three truth sources 102, as in system 100, the current state error estimate for the Kalman filter can be expressed with equation 1 below. Notably, in the equations below a bold-face lower-case symbol represents a vector, while a bold-face upper-case symbol represents a matrix. A lack of bold-face denotes a scalar quantity. A "hat" (^) above a variable denotes an estimated quantity. The vertical slash separates the subscript designations, where a lower-case i represents the truth source under consideration and a lower-case k represents a time index.

$$\hat{x}_k = \begin{bmatrix} \hat{x}_{1|k} \\ \hat{x}_{2|k} \\ \hat{x}_{3|k} \end{bmatrix}, \qquad \text{Eq. 1}$$

where the subscript to the left of the vertical slash indicates the respective truth source (1=truth source 102-1, 2=truth source 102-2, etc.)

Each of the current sub-state error vectors for the respective truth source can be expressed as follows in equation 2.

$$\hat{x}_{i|k} = \begin{bmatrix} \delta \hat{l}_x \\ \delta \hat{l}_y \\ \delta \hat{l}_z \\ \delta \hat{\theta}_x \\ \delta \hat{\theta}_y \\ \delta \hat{\theta}_z \\ \delta \hat{t}_p \\ \delta \hat{t}_v \\ \delta \hat{t}_\theta \end{bmatrix} \qquad \text{Eq. 2}$$

In equation 2, each sub-state error vector contains an estimate of a lever arm error state, $\delta \hat{l}$, for each Cartesian axis, x, y and z. Additionally each sub-state error vector contains misalignment error states, $\delta \hat{\theta}$, for each of the Cartesian axes and time skew error states, $\delta \hat{t}_p$, $\delta \hat{t}_v$, and $\delta \hat{t}_\theta$ for position, velocity, and attitude respectively.

Similarly a measurement vector of the measured differences between each truth source 102 and the test unit 104 can be expressed as shown in equation 3.

$$\hat{z}_k = \begin{bmatrix} \hat{z}_{1|k} \\ \hat{z}_{2|k} \\ \hat{z}_{3|k} \end{bmatrix} \quad \text{Eq. 3}$$

Each measurement sub-vector is formed using differences of the test unit measurement minus the ith truth source measurement as shown in equation 4. In particular, equation 4 shows the difference for linear position ($\hat{p}_{EB}^E$), linear velocity ($\hat{v}_{EB}^E$), linear acceleration ($\hat{a}_{EB}^E$), and angular position $\hat{\theta}_{EB}^E$). In this example, there is an exception for the angular rate or velocity measurement ($\hat{\omega}_{EB}^E$), which is taken directly as the truth source angular rate. Thus, each measurement sub-vector can be expressed as:

$$\hat{z}_{i|k} = \begin{bmatrix} \hat{p}_{EB}^E|_k - \hat{P}_{EB}^E|_{i|k} \\ \hat{v}_{EB}^E|_k - \hat{v}_{EB}^E|_{i|k} \\ \hat{a}_{EB}^E|_k - \hat{a}_{EB}^E|_{i|k} \\ \hat{\theta}_{EB}^E|_k - \hat{\theta}_{EB}^E|_{i|k} \\ \hat{\omega}_{EB}^E|_{i|k} \end{bmatrix} \quad \text{Eq. 4}$$

In equation 4, the superscript E and subscript EB refer to the measurements being taken in coordinates of the body frame with respect to the Earth frame of reference. A measurement model for the Kalman filter can be represented by a block measurement matrix containing observation matrix blocks for each truth source 102. In some embodiments, a user is able to configure the processing unit via the user input interface 108 to use all or a subset of the navigation solution provided by the truth sources 102. Additionally, a user can configure the processing unit 106 to estimate all or a subset of the different error states (e.g. lever arm, misalignment, time skews). For example, in one exemplary configuration, the processing unit 106 is configured to estimate all lever arm, misalignment and time skew errors using all three truth sources 102, but only with position, velocity and attitude (angular position) measurements.

The processing unit 106 is configured to prevent a configuration that is not possible from occurring. For example, the processing unit 106 is configured to prevent a configuration to estimate misalignments without enabling attitude or angular velocity measurements. Under an all-state, all-measurement configuration with three truth sources 102, the measurement model is represented by the matrix in equation 5. Similarly, the corresponding observation matrix blocks are shown in equation 6.

$$H_k = \begin{bmatrix} H_{1|k} & 0 & 0 \\ 0 & H_{2|k} & 0 \\ 0 & 0 & H_{3|k} \end{bmatrix} \quad \text{Eq. 5}$$

-continued $$H_{i|k} = \begin{bmatrix} 0 & 0 & v_{EB}^E|_k \\ H_{vi|k} & & a_{EB}^E|_k \\ H_{ai|k} & 0 & 0 \\ 0 & H_{\theta i|k} & T_E^B \omega_{EB}^E|_k \\ 0 & H_{\omega i|k} & 0 \end{bmatrix}, \text{where} \quad \text{Eq. 6}$$

$H_{vi|k} = \{\omega_{EB}^E|_k\}T_B^E$, $H_{ai|k} = (\{\omega_{EB}^E|_k\}^2 + \{\dot{\omega}_{EB}^E|_k\})T_B^E$, $H_{\theta i|k} = I$(identify matrix), and $H_{\omega i|k} = T_{Bi}^E(I - \{T_E^B \omega_{EB}^E|_k\})$ In the above equations, the matrix T represents a transformation matrix, also known as a rotation matrix, from the ith truth source body frame to the resolving frame, which is the Earth Centered Earth Fixed Frame in this example. The brackets, { }, indicate a skew-symmetric operator. Any features not enabled by the user, in other embodiments, would be replaced by a zero matrix of the appropriate size.

Similarly, the measurement vector in equation 3 will change in size and definition depending on the measurements used according to the user configuration. The a priori state and covariance equations for the Kalman filter are expressed in equations 7 and 8, respectively.

$$\hat{x}_k^- = \Phi_k \hat{x}_{k-1}^+ \quad \text{Eq. 7}$$

$$P_{k|k} = \Phi_k P_{k-1|k} \Phi_k^T + Q_k \quad \text{Eq. 8}$$

In equations 7 and 8, $\Phi_k$ is the state transition matrix which is defined as an identity matrix in this example since the error states are assumed to be constant. In addition, $Q_k$ in the above equations and $R_k$ in the following equations are noise covariance matrices. The Kalman gain and measurement update equations are shown in equations 9-12.

$$K_k = P_{k|k} H_k (H_k P_{k|k} H_k^T + R_k)^{-1} \quad \text{Eq. 9}$$

$$\hat{y}_k = \hat{z}_k - H_k \hat{x}_k^- \quad \text{Eq. 10}$$

$$\hat{x}_k^+ = \hat{x}_k^- + K_k \hat{y}_k \quad \text{Eq. 11}$$

$$P_{k|k+1} = (I - K_k H_k) P_{k|k} (I - K_k H_k)^T + K_k R_k K_k^T, \quad \text{Eq. 12}$$

where $$P_k = P_{k|k+1} = \begin{bmatrix} P_{1|k} & 0 & 0 \\ 0 & P_{2|k} & 0 \\ 0 & 0 & P_{3|k} \end{bmatrix}$$

The above equations, thus, represent the analysis performed in the Kalman filter executed by the processing unit 106 to estimate and remove one or more errors from the navigation solutions provided by the truth sources 102. Notably, the lever arm, misalignment, and time skew errors are not correlated between truth sources 102 in the above equations. In addition, the composite truth source navigation solution can be represented as the summation of information matrices and vectors shown in equations 13 and 14, where n equals 3 in this example.

$$P_{c|k} = (\Sigma_{i=1}^n P_{i|k}^{-1})^{-1} \quad \text{Eq. 13}$$

$$\hat{z}_{c|k} = P_{c|k} \Sigma_{i=1}^n P_{i|k}^{-1} \hat{z}_{i|k} \quad \text{Eq. 14}$$

The composite truth source navigation solution is dependent on the type of navigation systems implemented as the truth sources 102. For example, the NovAtel™ SPAN™ navigation system does not provide angular velocity or acceleration measurements. Thus, in embodiments implementing the NovAtel™ SPAN™ navigation system, only composite truth source measurements for position, velocity, and attitude are estimated.

Hence, through the estimation and correction of errors, as well as through the comparison of the test unit 104 navigation solution to a composite truth source navigation solution, system 100 enables a more accurate assessment of the performance of the test unit 104.

Figure 2:
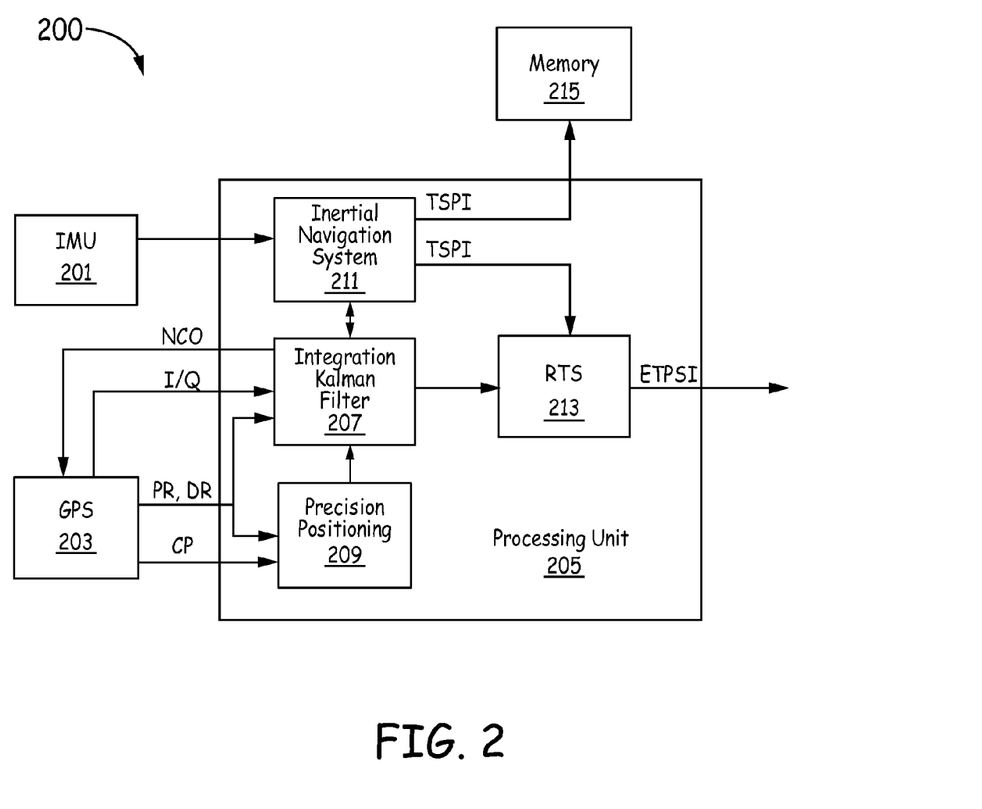
FIG. 2 is a high level block diagram of one embodiment of a navigation system.

FIG. 2 is a block diagram of one embodiment of a CRIIS TSPI navigation system 200. It is to be understood that system 200 is provided by way of example and that modifications can be made in other embodiments. System 200 includes a global positioning system (GPS) receiver 201, an inertial measurement unit (IMU) 203, and a processing unit 205. The IMU 203 provides inertial measurements such as a change in linear position and a change in angular position to the processing unit 205. Similarly, the GPS receiver 201 provides pseudo range (PR), delta range (DR), accumulated carrier phase (CP), and In-phase/Quadra-phase correlator (I/Q) measurements to the processing unit 205.

In particular, the processing unit 205 executes an integration Kalman filter 207, a precision positioning process 209, and an inertial navigation system (INS) process 211. The IMU inertial measurements are provided to the INS process 211. The I/Q, PR, and DR measurements are provided to both the integration Kalman filter 207 and to the precision positioning process 209. The CP measurements are provided to the precision positioning process 209 along with the PR and DR measurements. The precision positioning process 209 calculates position estimates based on the CP, PR, and DR measurements. The calculated position measurements from the precision positioning process 209 are provided to the integration Kalman filter 207. The integration Kalman filter 207 processes the position measurements from the precision positioning process 209; the I/Q, DR, and PR measurements from the GPS receiver 201, and position estimates from the INS process 211 to create feedback corrections for the INS process 211 and numerically controlled oscillator (NCO) commands for the GPS receiver in real-time.

Since the NCO commands are used by the GPS receiver to the create pseudo range (PR), delta range (DR) and accumulated carrier phase (CP) measurements, the GPS and INS navigation solutions are not independent. Hence, the IMU 203 and GPS 201 are ultra-tightly coupled together. Based on the corrections from the integration Kalman filter 207, the INS process 211 generates and outputs the Time, Space and Position Information (TSPI). Notably, the TSPI data is generated in real-time. The TSPI data can be output to a memory 215 for storage for further post-mission processing. That is, post-mission processing involves processing once all the data during a specified period has been acquired. The period can be defined by absolute start and stop times or by events which mark the start and stop time.

During the post-mission processing, the processing unit 205 executes the integration Kalman filter 207, precision positioning process 209, and INS process 211 similar to the real-time processing. However, the PR, DR and CP measurements used in post mission processing (PMP) are generated using vector tracking loop, ultra tightly coupled techniques instead of conventional scalar tracking loops. Therefore, the PR and DR measurements are correlated with each other and have very long correlation times. In addition, during the post-mission processing, the processing unit 205 also executes a fixed interval smoothing process 213, such as a Rauch, Tung, and Streibel (RTS) smoother, which operates on the TSPI data to produce enhanced TSPI (ETSPI) data. In some embodiments, both the TSPI and ETSPI are provided to the processing unit 106 for use in evaluating the performance of the test unit 104.

Figure 3:
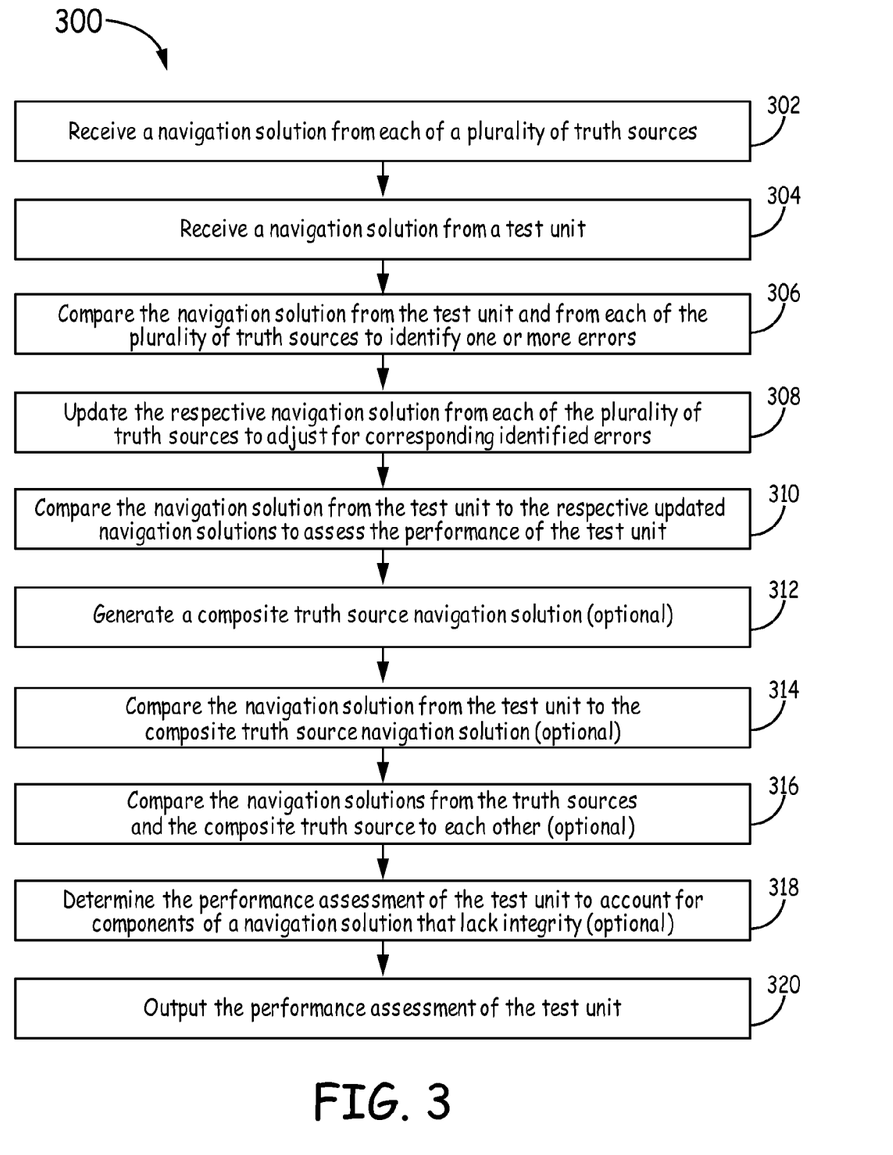
FIG. 3 is a flow chart of one embodiment of a method of assessing performance of a test unit in a truth reference system.

FIG. 3 is a flow chart depicting one embodiment of a method 300 of assessing performance of a test unit in a truth reference system, such as test unit 104 in system 100 described above. It is to be understood that the individual acts of method 300 need not be performed serially and that one or more of the acts may occur simultaneously or in a different order than the exemplary order discussed herein. At block 302, a navigation solution is received from each of a plurality of truth sources. At block 304, a navigation solution is received from a test unit. For example, a navigation solution is received from each of a plurality of navigation systems. One of the navigation systems is selected as the test unit and the other navigation systems are selected as the reference navigation systems. In some embodiments, the selection of a navigation system as the test unit is fixed. However, in other embodiments, the navigation system which is selected as the test unit can change or switch. In such embodiments, the test unit can be selected to be one of the reference navigation systems (also referred to as truth sources) and one of the reference navigation systems can be selected as the test unit at different points in time.

At block 306, the navigation solution from the test unit is compared with the respective navigation solution from each of the plurality of truth sources to identify one or more errors in differences between the navigation solution from the test unit and the respective navigation solution from each of the plurality of truth sources. As discussed above, the identified errors can be due to lever arm, misalignment, and/or timing differences between the respective truth sources and the test unit. Thus, each of the truth sources may operate properly errors may still exist in the comparison of the respective navigation solutions. In some embodiments, a user can select which components of the navigation solution to use for identifying the error. Additionally, in some embodiments, a user can select which errors to identify.

At block 308, the respective navigation solution from each of the plurality of truth sources is updated to adjust for corresponding identified errors. For example, as described above, a Kalman filter can be configured to identify errors and update the respective navigation solutions. At block 310, the navigation solution from the test unit is compared to the respective updated navigation solution from each of the plurality of truth sources to assess the performance of the test unit. Assessing the performance of the test unit refers to determining how close the test unit navigation solution is to the respective navigation solution of the truth sources. In particular, the accuracy of the truth sources is known to be within a predetermined range. Thus, if the navigation solution of the test unit can be determined to be within the same range based on how closely it matches the respective navigation solution of the truth sources. Furthermore, a performance score can be generated to indicate the performance of the test unit. In particular, the score indicates how closely the navigation solution from the test unit matches the respective navigation solutions of the truth sources.

At block 312, a composite truth source navigation solution is optionally generated based on a combination of the respective navigation solutions from the plurality of truth sources. At block 314, the navigation solution from the test unit is optionally compared to the composite truth source navigation solution to assess the performance of the test unit.

At block 316, the respective navigation solution from each of the truth sources is optionally compared to the respective navigation solutions from the other truth sources to determine the integrity of each of the truth sources. In addition, in some embodiments, each of the navigation solutions from the truth sources is also compared to the composite truth source to determine the integrity of the composite truth source. The integrity of a truth source refers to whether or not the truth source is operating properly. For example, if one or more components of a given truth source's navigation solution differs from the corresponding component of the other truth sources' navigation solutions by more than a predetermined threshold, it is determined that at least that component of the given truth source's navigation solution is in error.

At block 318, the performance assessment of the test unit is optionally determined to account for components of a truth source or reference navigation solution that lack integrity. For example, if it is determined that a given component of a truth source navigation solution lacks integrity, that component can be excluded when comparing the test unit navigation solution to the truth source navigation solutions when assessing the performance of the test unit.

At block 320, the performance assessment of the test unit is output to an output device. For example, the performance assessment can be output as a graph to a display unit. In addition, the determined integrity of each of the truth sources and of the composite truth source can be output, in some implementations.

Hence, the embodiments described herein enable a more accurate analysis of the performance of the test unit by identifying and correcting for errors based on navigation solutions from a plurality of truth sources. In particular, the embodiments described above enable identifying errors which are not caused by faulty performance of the test unit or the plurality of truth sources. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   a plurality of reference navigation systems, each reference navigation system configured to generate a respective reference navigation solution;
   a test navigation system, the test navigation system configured to generate a test navigation solution; and
   a processing unit configured to compare the test navigation solution to each of the respective reference navigation solutions to estimate one or more errors in the differences between the test navigation solution and the respective reference navigation solutions;
   wherein the processing unit is further configured to update the respective reference navigation solutions to account for the corresponding one or more estimated errors;
   wherein the processing unit is configured to compare the test navigation solution to the updated reference navigation solutions to generate a performance score representative of the performance of the test navigation system.

2. The system of claim 1, wherein one of the plurality of reference navigation systems and the test navigation system are each implemented as a first type of navigation system.

3. The system of claim 1, wherein the processing unit is further configured to generate a composite reference navigation solution based on each of the respective reference navigation solutions from the plurality of reference navigation systems;
   wherein the processing unit is configured to generate the performance score representative of the performance of the test navigation solution based on a comparison of the test navigation solution to the composite reference navigation solution.

4. The system of claim 1, wherein the plurality of reference navigation systems comprises three reference navigation systems.

5. The system of claim 1, further comprising an output device, the processing unit configured to output the performance score to the output device.

6. The system of claim 1, wherein the one or more errors comprise at least one of a lever arm error, misalignment error, or time skew error.

7. The system of claim 1, wherein the processing unit is configured to process the test navigation solution as a reference navigation solution and to select one of the reference navigation solutions from the plurality of reference navigation systems for processing as a test navigation solution.

8. The system of claim 1, wherein the processing unit is configured to compare each respective reference navigation solution to the other reference navigation solutions to determine integrity of each of the respective reference navigation solutions.

9. A program product comprising a non-transitory processor-readable medium on which program instructions are embodied, wherein the program instructions are configured, when executed by at least one programmable processor, to cause the at least one programmable processor to:
   compare a first navigation solution received from a first navigation system with a plurality of other navigation solutions, each of the other navigation solutions received from a respective other navigation system;
   estimate one or more errors based on the comparison of the first navigation solution to the plurality of other navigation solutions;
   modify the plurality of other navigation solutions based on the estimated one or more errors;
   compare the first navigation solution to the plurality of modified other navigation solutions to generate a performance score of the first navigation system; and
   output the performance score to an output device.

10. The program product of claim 9, wherein the program instructions are further configured to cause the at least one programmable processor to generate a composite navigation solution based on the plurality of other navigation solutions and to compare the first navigation solution to the composite navigation solution when generating the performance score.

11. The program product of claim 9, wherein the program instructions are further configured to cause the at least one programmable processor to estimate one or more of a lever arm error, misalignment error, or time skew error based on the comparison of the first navigation solution to the plurality of other navigation solutions.

12. The program product of claim 11, wherein the program instructions are further configured to cause the at least one programmable processor to estimate a respective time skew error for each navigation state of the first navigation solution.

13. The program product of claim 9, wherein the program instructions are further configured to cause the at least one programmable processor to compare the plurality of other navigation solutions to one another to determine the integrity of each of the plurality of other navigation systems.

14. The program product of claim 13, wherein the program instructions are further configured to cause the at least one programmable processor to output an indication of the integrity of each of the other navigation systems.

15. The program product of claim 9, wherein the program instructions are further configured to cause the at least one programmable processor to output instructions to the output device to cause the output device to display a graph representative of the one or more estimated errors.

16. A method of assessing performance of a test navigation system in a reference system having a plurality of reference navigation systems, the method comprising:

receiving a respective navigation solution from each of a plurality of navigation systems, a first navigation system of the plurality of navigation systems selected as the test navigation system and the other navigation systems of the plurality of navigation systems selected as the reference navigation systems, the plurality of navigation systems comprising more than three navigation systems;

comparing the navigation solution from the selected test navigation system with the respective navigation solution from each of the plurality of reference navigation systems to identify one or more errors in differences between the navigation solution from the selected test navigation system and the respective navigation solution from each of the plurality of reference navigation systems;

updating the respective navigation solution from each of the plurality of reference navigation systems to adjust for corresponding errors identified by comparing the navigation solution from the selected test navigation system with the respective navigation solution from each of the plurality of reference navigation systems; and comparing the navigation solution from the selected test navigation system with the updated navigation solutions from each of the plurality of reference navigation systems to generate a performance score indicative of the performance of the test navigation system.

17. The method of claim 16, further comprising:

generating a composite navigation solution based on a combination of the respective navigation solutions from the plurality of reference navigation systems; and comparing the navigation solution from the selected test navigation system to the composite navigation solution to generate the performance score.

18. The method of claim 17, further comprising:

comparing the respective navigation solution from each of the plurality of reference navigation systems to the composite navigation solution to determine the integrity of the composite navigation solution.

19. The method of claim 16, further comprising:

comparing the respective navigation solution from each of the plurality of reference navigation systems to each other to determine the integrity of each of the plurality of reference navigation systems.

20. The method of claim 16, further comprising selecting one of the plurality of navigation systems other than the first navigation system as the test navigation system and selecting the first navigation system as a reference navigation system.

* * * * *